United States Patent [19]

Renner

[11] Patent Number: 5,349,152
[45] Date of Patent: Sep. 20, 1994

[54] PROCESS FOR THE ELECTRIC WELDING OF TWO WELD PARTS

[75] Inventor: Wolf Renner, Giessen, Fed. Rep. of Germany

[73] Assignee: Emhart, Inc., Newark, Del.

[21] Appl. No.: 1,364

[22] Filed: Jan. 7, 1993

[30] Foreign Application Priority Data

Jan. 7, 1992 [DE] Fed. Rep. of Germany ....... 4200199

[51] Int. Cl.$^5$ .......................... B23K 9/20; B23K 11/00
[52] U.S. Cl. ......................... 219/99; 219/74; 219/117.1
[58] Field of Search ................ 219/72, 74, 98, 99, 219/117.1, 119, 120, 127

[56] References Cited

U.S. PATENT DOCUMENTS

| | | | |
|---|---|---|---|
| 2,502,876 | 4/1950 | Mullen | 219/120 |
| 2,536,726 | 1/1951 | Cornwall | 219/120 |
| 3,363,084 | 1/1968 | Busing | 219/99 |
| 3,526,740 | 9/1970 | Brinkman et al. | 219/74 |
| 3,526,746 | 9/1970 | Campbell | 219/127 |
| 4,536,637 | 8/1985 | Horiuchi et al. | 219/117.1 |
| 4,609,805 | 9/1986 | Tobita et al. | 219/119 |
| 4,910,379 | 3/1990 | Preston | 219/98 |

FOREIGN PATENT DOCUMENTS

| | | | |
|---|---|---|---|
| 1162497 | 2/1964 | Fed. Rep. of Germany | 219/99 |
| 1215838 | 5/1966 | Fed. Rep. of Germany | . |
| 2818896 | 11/1979 | Fed. Rep. of Germany | 219/98 |
| 2213834 | 8/1974 | France | . |
| 54-3146 | 2/1979 | Japan | 219/99 |
| 54-137453 | 10/1979 | Japan | 219/99 |

*Primary Examiner*—Clifford C. Shaw
*Attorney, Agent, or Firm*—Edward D. Murphy

[57] ABSTRACT

The invention relates to a process for the electric welding of two weld parts by the flow of electric current through a welding point and the use of fluid such as an inert or protective gas to inhibit or prevent or eliminate oxidation at the welding point. The fluid is supplied through a continuous bore in one weld part and is directed toward the welding point, so that the fluid sweeps over the welding point radially from the bore. The fluid may be an inert gas such as argon or nitrogen, optionally mixed with carbon dioxide; alternatively the fluid may be aqueous liquid, the water being vaporized in the region of the welding point.

9 Claims, 2 Drawing Sheets

PROCESS FOR THE ELECTRIC WELDING OF TWO WELD PARTS

BACKGROUND OF THE INVENTION

The invention relates to a process for the electric welding of two weld parts by means of the flow of current via the welding point to produce a melt pool of metal for the weld and the use of fluid e.g. gas to prevent or eliminate, or at least inhibit, oxidation at the welding point and to a weld part for application of this process.

The welding of two parts using a particular fluid or gas to prevent or eliminate oxidation at the welding point, in particular a protective gas, is described in many publications. Reference is made, for example, to DE-PS 29 33 863 which relates to a device for the welding of a stud to a workpiece in which a drawn arc is produced and gas streams extend round the stud and are directed from the exterior onto the welding point by means of an external gas supply.

Protective gas has also already been used in resistance welding. According to EP Application 0 302 333, the protective gas is blown from the exterior onto the welding point.

With known welding processes, the welding point has been screened by bell-like covers in order to intensify the effect of a supplied gas, in particular a protective gas, introduced into the covers. The introduced gas can either issue through openings between the cover and the respective workpiece or can expel the air previously contained in the cover (see DE-PS 26 47 845 and DE-PS 31 49 835). However, it is also known from DE-OS 28 18 896 to place a cover of this type onto the surface of the respective workpiece in a sealing manner and to exhaust the air to be driven out, via a particular aspirator.

This method of supplying a particular gas, in particular protective gas, from the exterior results in considerable gas consumption; if a cover is not used, the gas also whirls air into the welding point and this has to be compensated by a correspondingly high supply of gas. If a cover is used, its interior first has to be flushed free of air and this also correspondingly increases the actual gas consumption intended for the welding point. Furthermore, this flushing process leads to a corresponding delay in the initiation of welding as it is necessary to wait until substantially all remnants of air in the cover are flushed out.

It is an object of the present invention is to provide a process of the kind mentioned above such that the effect of supplying a particular fluid, e.g. gas to the welding point is improved with respect to the time and to the fluid requirement.

BRIEF DESCRIPTION OF THE INVENTION

According to the present invention, a process for the electric welding of two weld parts by the flow of electric current through the welding point with the use of fluid, e.g. gas to inhibit or prevent or eliminate oxidation at the welding point, is characterised in that the fluid is supplied through a continuous bore in one weld part, directed toward the welding point, so that the fluid sweeps over the welding point radially outwards from the bore.

Normally the fluid is an inert or protective gas but it may be desired to use a gas which eliminates existing oxidation and therefore has a reducing effect. In some circumstances a liquid can be supplied which is gasified when flowing over the welding point.

Owing to the supply of fluid through a continuous bore directed toward the welding point in the sense of an internal fluid supply, the fluid is conveyed intentionally and directly over the welding point where it immediately directly displaces air present in the narrow region between the two weld parts, for which purpose the amount of fluid required is only that contained in the normally restricted narrow space between the weld parts. The subsequent flow of the fluid within this narrow space then prevents access of air from the exterior to the welding point because of the fluid flowing radially outwardly over the welding point. In this process, there is obviously little risk of the ingress of air. Moreover, the effect of wrapping of the welding point simultaneously with the supply of fluid takes place without having to wait for the clearing of air prior to filling and covering.

Intensification of the effect of the fluid at the welding point can be promoted, in particular, if the fluid is conveyed to the centre of the welding point. This results in substantially radially symmetrical dissipation of the fluid stream and therefore correspondingly uniform sweeping of the welding point.

If the process is used for the welding of a weld stud, the fluid may be conveyed through the centre of the weld stud to the welding point during the burning of a drawn arc.

If the process involves the application of resistance welding, the fluid may be conveyed through flow grooves in one weld part over the welding point during the flow of current. As the welding points touch one another during resistance welding, the flow grooves ensure that the fluid flows uniformly round the welding points at the contact points between the two weld parts from the interior as in the above-mentioned case of the welding of a weld stud.

The fluid used may be an inert gas such as argon, nitrogen or helium, the choice being determined to some extent by the nature of the materials being welded and by the chosen welding conditions. When welding aluminium sheets, good results have been obtained using a mixture of argon and carbon dioxide. For some applications the fluid may be an aqueous liquid, the water being vaporised in the region of the welding point.

A weld stud which is particularly suitable for application of the process may be designed so that it is coaxially penetrated by a bore. A relatively small bore diameter is sufficient, say having a diameter of up to about 1.5 mm maximum.

The process according to the invention is suitable for the welding both of weld studs with an ignition tip and of weld studs with a conical weld face. In the first case, the bore may penetrate the ignition tip coaxially so that an annular ignition tip is left standing. In the latter case, the bore usually ends in the tip of the conical weld face.

When applying resistance welding, the weld face of the bored weld part is preferably provided with flow grooves for conveying the fluid over the welding point. To create the flow grooves, the weld face can be provided with several projections between which the spaces form the flow grooves.

BRIEF DESCRIPTION OF THE DRAWINGS

In order that the invention, be better understood, preferred embodiments will now be described in greater detail by way of example with reference to the accompanying drawings in which.

DETAILED DESCRIPTION OF THE DRAWINGS AND PREFERRED EMBODIMENTS

Figure 1:
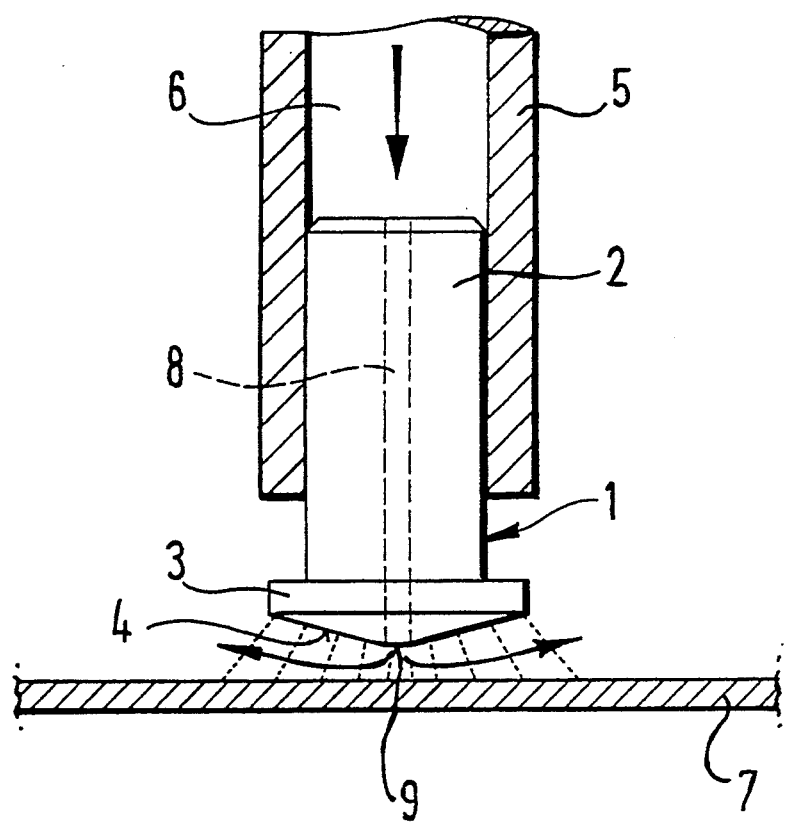
FIG. 1 shows a weld stud, to be welded to a plate, with a conical weld face and coaxially supplied gas.

FIG. 1 shows the weld stud 1 with its shank 2, the weld flange 3 and the conical weld face 4. The shank 2 is held by a tubular chuck 5 of a welding tool (not shown). A protective or inert gas is supplied to interior 6 of the chuck 5, as indicated by the arrow. The chuck 5 is moved in a known manner together with the weld stud 1 toward plate 7 acting as one weld part in order to ignite an arc, whereupon the chuck 5 is withdrawn into the position shown in FIG. 1, the arc indicated by the radiating lines burning between conical weld face 4 and plate 7. The surface of the plate 7 facing weld stud 1 and the conical weld face 4 then begin melting in the normal manner, whereupon the chuck 5 is again moved toward the plate, the weld stud 1 with its weld face 4 dipping into the pool of melt on plate 7 and thus producing the welded joint.

The weld stud 1 is provided with a continuous bore 8 which coaxially penetrates weld stud 1 and issues at tip 9 of the conical weld face 4. This produces a closed channel for the conveyance of the protective gas supplied to the interior 6 and therefore issues at the tip 9, dissipates radially to bore 8 over the welding point on plate 7 as indicated by the arrows and thus sweeps over the plate. As the protective gas supplied in this way only has to fill a restricted space in the region between weld face 4 and plate 7, the protective gas is dispersed substantially abruptly over the welding point on the plate 7 after the protective gas supply to the interior 6 has been switched on, without a significant time delay occurring. This means that the supply of protective gas can be switched on immediately before ignition of the arc so that it abruptly displaces the air from the space between weld face 4 and plate 7 and completely fills this space (see arrows). The protective gas thus fulfils its role of preventing or inhibiting oxidation at the welding point. If desired, the gas supply can be switched off immediately before the plunge of the weld stud 1 into the melt pool.

When applying the process of the present invention to the welding of aluminium sheets as described in our European patent application 92306877.9, successful welds were obtained when using argon mixed with carbon dioxide.

Figure 2:
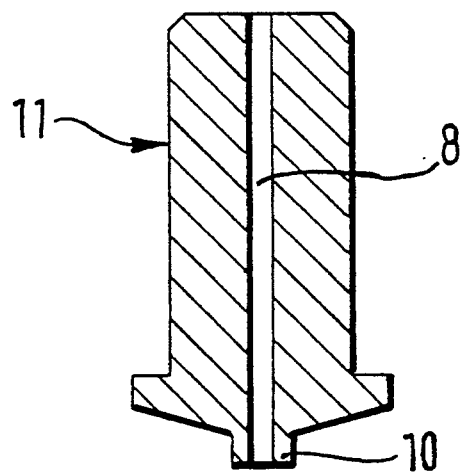
FIG. 2 shows in section a weld stud with an ignition tip and a coaxial bore.

FIG. 2 shows a weld stud which is provided with the weld tip 10 and has a continuous bore 8. As it is coaxial in weld stud 11, the bore 8 ends in weld tip 10 so that the weld tip 10 is formed as a ring penetrated by the bore 8. Weld stud 11 can be inserted in the same way as shown in FIG. 1 into a chuck with a particular gas supply.

Figure 3:
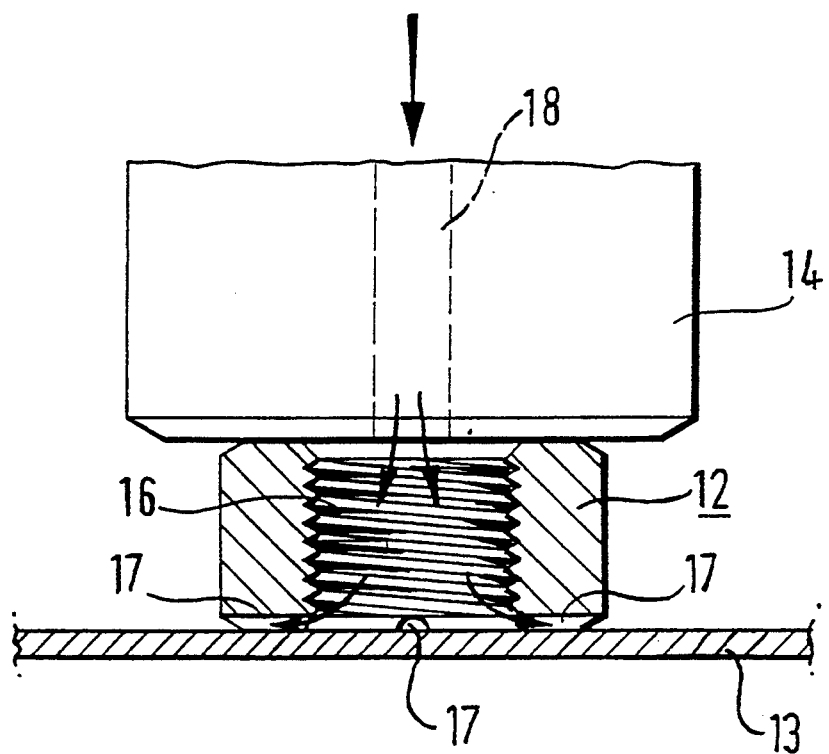
FIG. 3 shows a nut provided with projections and which forms one weld part to be welded to a plate by resistance welding.

FIG. 3 shows the application of the process according to the invention in conjunction with a resistance welding procedure in which an electric current is conveyed via the welding point and the welding point is accordingly heated. One weld part consists of the nut 12 which is shown in section and is to be welded to plate 13. Pressure piece 14 of a welding tool, not otherwise illustrated, which presses the nut 12 against the plate 13, mounted in a manner which is not illustrated, presses the nut 12. Pressure piece 14 and plate 13 are connected to a source of electric current.

Figure 4:
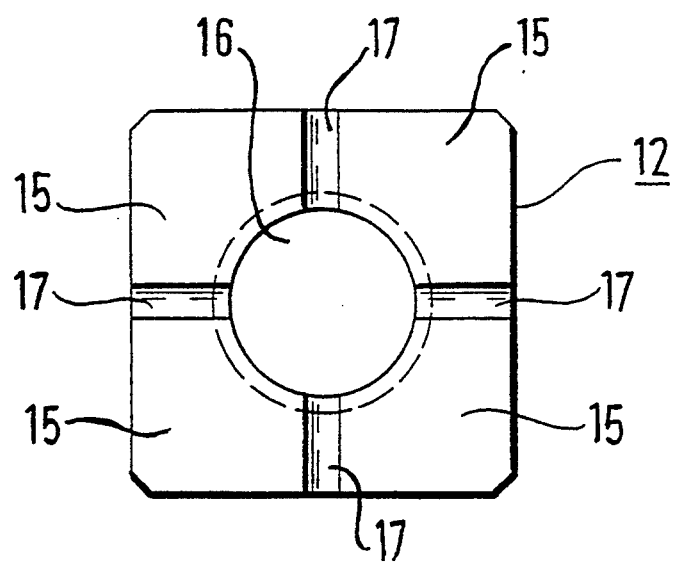
FIG. 4 shows the nut of FIG. 3 when viewed from the weld face side.

To produce contact points formed round nut 12 on plate 13, the nut 12 is provided with projections 15 shown in FIG. 4. FIG. 4 shows the nut 12 as viewed from the side of the plate 13. Spaces 17 extend radially outwardly from bore 16 in nut 12, between the projections 15. When protective gas is supplied to bore 16, it passes through the spaces 17 acting as flow grooves and therefore sweeps over the surface of plate 13 to be welded. Owing to unavoidable irregularities of the projections 15 and of the plate 13, narrow gaps are formed between the two weld parts 12 and 13 in addition to the spaces 17, so that in effect the protective gas introduced into bore 16 sweeps over virtually the entire surface of plate 13 if the plate is to be welded. A surge of protective gas in the bore 16 leads, virtually immediately, to corresponding flooding of the respective surface of plate 16 by the protective gas. Owing to the contact between nut 12 and plate 13 which is limited to relatively small areas, an electric resistance is produced between these two weld parts which is utilised for resistance welding is produced between these two weld parts. This resistance leads to corresponding heating of the contact points between nut 12 and the plate 13 so that melting of the respective material takes place so that welding of the two weld parts at the contact points ensues.

In the embodiment according to FIG. 3, the protective gas is supplied through central channel 18 in pressure piece 14 to the bore 16 of nut 12. This method of supply corresponds in principle to the one shown in FIG. 1.

What is claimed:

1. A method of supplying a protective fluid to a welding gap between two metal parts for displacing contaminants therefrom during welding comprising the steps of:
   providing an electrode having a bore centrally located therein;
   providing a supply of protective fluid communicated with said bore;
   providing a first weld part comprising a solid stud having a generally cylindrical body with an end surface, said body having an axial bore therethrough opening into said end surface, and said end surface having an arc-focusing portion surrounding said bore, said portion extending outwardly from said cylindrical body further than the circumferential extremity of said end surface;
   providing a second weld part having a substantially flat surface to which said first weld part is to be attached;
   applying said electrode to said first weld part to hold said first and second weld parts in proximity, the bore in said electrode being aligned with the bore in said first weld part and said arc-focusing portion being disposed in close proximity to said surface of said second weld part; and supplying said protective fluid through said aligned bores to flush contaminants from the gap between said weld parts as the welding arc is drawn therebetween, said fluid being directed by said portion into the region of arc ignition between said portion and said second weld part.

2. A method according to claim 1 wherein said fluid comprises argon mixed with carbon dioxide.

3. A method according to claim 1 wherein said fluid is supplied as a liquid which is gasified when flowing over the welding point.

4. A method as claimed in claim 1 wherein said end surface of said first weld part is conically tapered from said portion to said circumferential extremity to provide for smooth propagation of an arc from said portion toward said extremity.

5. A method as claimed in claim 1 wherein the bore provided in said stud is small relative to the diameter of said stud.

6. In a welding apparatus for electrically welding one end of an elongated solid body to a substantially planar surface by means of electrical resistance heating, said electrode being configured to hold said body against said planar surface, the improvement comprising said electrode having a channel therethrough;

said body having a bore therethrough;

said channel in said electrode being aligned with said bore in said body for conveying a stream of protective fluid to the interface between said body and said surface for expelling contaminants therefrom as welding occurs.

7. An apparatus as claimed in claim 6, wherein said bore passes coaxially through said body.

8. An apparatus as claimed in claim 6, wherein the weld face of said body is provided with flow grooves, issuing from the bore, for conveyance of said fluid across the contacting faces of said body and said planar surface.

9. An apparatus according to claim 8, wherein said flow grooves are formed by spaces between projections arranged in the weld face.

* * * * *